(12) United States Patent
Robinet et al.

(10) Patent No.: US 7,210,447 B2
(45) Date of Patent: ***May 1, 2007

(54) IGNITION DEVICE WITH PRECOMBUSTION CHAMBER COATED WITH A REFRACTORY COATING LAYER, FOR INTERNAL COMBUSTION ENGINE, AND IGNITER WITH PRECOMBUSTION CHAMBER

(75) Inventors: Cyril Robinet, Igny (FR); Nicolas Tourteaux, Rueil Malmaison (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/531,721

(22) PCT Filed: Oct. 17, 2003

(86) PCT No.: PCT/FR03/03084

§ 371 (c)(1),
(2), (4) Date: Sep. 21, 2005

(87) PCT Pub. No.: WO2004/036014

PCT Pub. Date: Apr. 29, 2004

(65) Prior Publication Data

US 2006/0144362 A1    Jul. 6, 2006

(30) Foreign Application Priority Data

Oct. 18, 2002  (FR) .................................. 02 13019

(51) Int. Cl.
*F02B 19/16* (2006.01)

(52) U.S. Cl. ...................... 123/255; 123/266; 123/270; 123/293

(58) Field of Classification Search ................ 123/254, 123/255, 266, 267, 268, 270, 271, 272, 293
See application file for complete search history.

(56) References Cited

U.S. PATENT DOCUMENTS

| 2,979,043 | A | * | 4/1961 | Meurer et al. ............ 123/25 R |
| 3,044,454 | A | * | 7/1962 | Sutton ........................ 123/271 |
| 4,237,845 | A | | 12/1980 | Kato et al. |
| 4,394,855 | A | | 7/1983 | Latsch et al. |
| 4,738,227 | A | | 4/1988 | Kamo et al. |

(Continued)

FOREIGN PATENT DOCUMENTS

DE           29 08 859        9/1980

(Continued)

*Primary Examiner*—T. M. Argenbright
(74) *Attorney, Agent, or Firm*—Nicolas E. Seckel

(57) ABSTRACT

The invention concerns an ignition device for internal combustion engine, containing:
a main chamber (1) designed for including a main combustible mixture, and fitted with a compression system of said mixture, and
an igniter (11) containing a precombustion chamber (2) designed for receiving reactants and an ignition system (13,14) of the reactants contained in the precombustion chamber (2), said precombustion chamber (2) being defined by a precombustion chamber body (12) having a head (12*a*) including at least one passageway (15), said head (12*a*) of the precombustion chamber body separating the precombustion chamber (2) from the main chamber (1) and communicating the precombustion chamber (2) and the main chamber (1) by dint of the passageway(s) (15),
characterised in that the head (12*a*) is coated at least partially externally with a coating layer (R) of at least one refractory material.

28 Claims, 3 Drawing Sheets

U.S. PATENT DOCUMENTS 5,014,664 A * 5/1991 Matsuoka .................... 123/271
5,040,504 A * 8/1991 Matsuoka .................... 123/254
5,054,443 A * 10/1991 Kawamura .................. 123/254
5,163,385 A * 11/1992 McMillian ................... 123/270
7,082,920 B2 * 8/2006 Robinet et al. ............. 123/260

FOREIGN PATENT DOCUMENTS

FR            2 781 840        2/2000

* cited by examiner

IGNITION DEVICE WITH PRECOMBUSTION CHAMBER COATED WITH A REFRACTORY COATING LAYER, FOR INTERNAL COMBUSTION ENGINE, AND IGNITER WITH PRECOMBUSTION CHAMBER

The present invention concerns an ignition device for internal combustion engine, as well as an igniter with precombustion chamber.

The ignition device according to the invention comprises an igniter with precombustion chamber which may be screwed instead of a conventional ignition sparking plug without any modifications of the cylinder head of the internal combustion engine (diameter smaller than or equal to 14 mm), the means for igniting an oxidant and fuel mixture being contained in a precombustion chamber defined by a body whereof the head is fitted with passageways.

Thus, when the igniter with precombustion chamber is mounted in the cylinder head of the engine, the precombustion chamber of the igniter is separate from the main combustion chamber of the engine by the head of the precombustion chamber body and communicates with the main combustion chamber by dint of the passageways provided in such head.

The igniter with precombustion chamber may possibly be fitted with means enabling to introduce directly the reactants in the precombustion chamber.

The patent U.S. Pat. No. 4,926,818 describes a device and a method for generating pulsed jets designed to form swirling combustion pockets. The device described comprises a main chamber containing a main combustible mixture wherein a piston travels and a precombustion chamber receiving reactants and communicating with the main chamber via orifices drilled in a wall. The ignition of the reactants in the precombustion chamber generates gas jets in combustion, which ignite the main mixture contained in the main chamber by convection of the flame front.

The patent application FR 2 781 840 describes an ignition device of internal combustion engine containing:
  a main chamber designed for including a main combustible mixture, and fitted with a compression system of said mixture,
  a precombustion chamber designed for receiving reactants and communicating with the main chamber via orifices drilled in a wall separating the main chamber of the precombustion chamber,
  a system for igniting the reactants contained in the precombustion chamber.

In such a device, which proves globally satisfactory, the orifices are of small diameter and capable of preventing the propagation of a flame front while enabling the propagation of the unstable compounds derived from the combustion of the reactants contained in the precombustion chamber. The compression system and the seeding of the main mixture with unstable compounds enable mass self-ignition of the initial mixture.

The patent application FR 2 810 692 also concerns an ignition device for internal combustion engine including a precombustion chamber generally cylindrical in shape, similar to that described in the application FR 2 781 840, but whereof the passageways communicating with the main combustion chamber are circumscribed by a circular curve running through the centres of the outermost passageways, the diameter of such circular curve being in a ratio smaller than or equal to ½ with the diameter of the cylindrical precombustion chamber. Such an arrangement enables the operation of the engine with a small quantity of oxidant air, in particular when the composition of the air-fuel mixture in the main chamber is stoichiometric, for depollution purposes with a three-way catalyst.

These devices may still be improved.

Notably, the present invention concerns an ignition device for internal combustion engine which may exhibit the following advantages:
  increased efficiency of the combustion in the precombustion chamber,
  improved operation of the engine on small loads, and enhanced stability of the operation of the engine in idle mode.

To this end, the invention concerns an ignition device for internal combustion engine, containing:
  a main chamber designed for including a main combustible mixture, and fitted with a compression system of said mixture,
  an igniter containing a precombustion chamber designed for receiving reactants and an ignition system of the reactants contained in the precombustion chamber, said precombustion chamber being defined by a precombustion chamber body having a head including at least one passageway, said head of the precombustion chamber body separating the precombustion chamber from the main chamber and communicating the precombustion chamber and the main chamber by dint of the passageway(s).

According to the invention, the head is coated at least partially externally with a coating layer of at least one refractory material.

By refractory material is meant a non-metal material, but which may contain a metal constituent, whereof the pyroscopic resistance is equivalent to 1500° C.

Preferably, the precombustion chamber body is coated at least partially internally with a coating layer of at least one refractory material.

Preferably still, the passageway(s) are coated with a coating layer of at least one refractory material.

According to a preferred embodiment of the invention, the coating layer is a nano-structured coating layer, i.e. whereof the size of the grains is greater than or equal to 1 nm and smaller than 1000 nm.

The refractory coating layer according to the invention may consist of a single layer of at least one refractory material or of two layers of at least one refractory material.

The refractory material(s) may be any type of refractory materials used currently to resist high temperatures and which are capable of resisting pressure constraints due to the operation of the ignition device.

One may quote in particular nitrides, borides, silicides, carbides, zirconium alloys, yttrium alloys, titanium alloys and boron alloys, oxides, preferably aluminium, titanium, iron, silicon, cerium, manganese and zirconium oxides, as well as zirconias having been subjected to the addition of at least one metal oxide selected among calcium, magnesium, yttrium, hafnium and rare earth oxides.

By rare earth is meant all the elements whereof the atomic number ranges between 57 (lanthanum) and 71 (lutetium).

Preferably, the refractory material(s) are selected among $Al_2O_3$, $SiO_2$, $CeO_2$, $MnO_2$, $ZrO_2$, $ZrY$, $Zr$ and $Y$ being in stoichiometric proportions or not, and $TiB_2$, preferably among $Al_2O_3$, $ZrY$, $Zr$ and $Y$ being in stoichiometric proportions or not, and $TiB_2$.

Preferably, the thickness of the coating layer of the refractory material(s) ranges between 0.5 and 100 µm, preferably still between 1 and 50 µm.

The application of the refractory coating layer according to the invention may take place by a liquid phase method, the liquid phase having suitable wetting and surface tension properties.

The deposition of the refractory coating layer according to the invention may still take place by the use of powder, by thermal projection (by electric arc or by plasma), by chemical vapour phase deposition (CVD), by physical vapour phase deposition (PVD) or still by electro-deposition.

The coating layer of at least one refractory material according to the invention enables to provide a thermal barrier effect.

Notably, the refractory coating layer on the external face of the head of the precombustion chamber body enables to limit the thermal transfers between the main mixture in combustion and the body of the precombustion chamber.

The refractory coating layer on the internal wall of the precombustion chamber body enables to limit the thermal transfers between the reactants in combustion in the precombustion chamber and the body of the precombustion chamber.

The limitation of the thermal transfers towards the body of the precombustion chamber improves the combustion in the precombustion chamber accordingly.

The refractory coating layer according to the invention is still advantageously hooked correctly to the substrate represented by the body of the precombustion chamber, which is generally a copper alloy.

Moreover, the refractory coating layer according to the invention enables to reduce or to prevent the adhesion of the compounds derived from the combustion of the reactants in the precombustion chamber, on the walls of the body of precombustion chamber, of the head or of the passageways.

In the case of a two-layer coating, the function of non-adhesion of the compounds derived from the combustion is fulfilled by the upper layer, and the thermal barrier function is fulfilled by the lower layer.

Finally, the small thickness and the structure of the refractory coating layer according to the invention enables to avoid too high differential expansion constraints.

Thus, the operation of the engine on small loads and the stability in idle modes are improved.

Such refractory coating layers are particularly suited to precombustion chamber igniters intended for use with heavily supercharged internal combustion engines, i.e. having an Average Effective Pressure greater than or equal to 13 bars.

According to a first embodiment, the ignition of the main mixture contained in the main chamber takes place by convection of the flame front derived from the ignition of the reactants contained in the precombustion chamber.

In such a case, the passageway(s) are preferably of cylindrical shape and of diameter greater than 1 mm.

According to a second embodiment, the passageway(s) are capable of preventing the propagation of a flame front while enabling the propagation of unstable compounds derived from the combustion of the reactants contained in the precombustion chamber and the seeding of the main mixture with said unstable compounds enabling mass self-ignition of the main mixture.

The self-ignition in a large volume enables very quick pressure rise, a reduced pinkling and good repeatability.

In such a case, said passageway(s) are preferably of cylindrical shape and of diameter smaller than or equal to 1 mm.

Preferably still, said passageway(s) have a length smaller than or equal to the diameter thereof. By length is meant the dimension of the passageways according to a direction perpendicular to the surface of the separation wall. This way, the smallest possible quantity of unstable compounds are trapped to the walls.

Generally, the number of passageway(s) ranges between 1 and 20, preferably between 3 and 15.

In the case of self-ignition of the mixture by seeding of the main mixture with unstable compounds, according to a preferred embodiment:

the upper section of the body of precombustion chamber, not adjoining the main chamber, is in the form of a cylinder of inner diameter $\phi$, and the head of the precombustion chamber body comprises several passageways, said passageways being circumscribed by a circular curve of diameter $d_2$ running through the centres of the outermost passageways, the ratio $d_2/\phi$ being smaller than or equal to 0.5.

Preferably, the ratio $d_2/\phi$ is smaller than or equal to ⅓.

Advantageously, the centre of the curve running through the centres of the outermost passageways is situated on the axis symmetry of the precombustion chamber.

But according to another embodiment, the centre of the curve running through the centres of the outermost passageways may be situated at a distance $d_3$ from the axis of symmetry of the precombustion chamber, equal to or greater than the quarter diameter $\phi$ of the precombustion chamber. Such configuration enables to direct preferably the jets of flames or of unstable compounds towards a particular zone of the combustion chamber, in relation to the position of said centre of the curve with respect to the axis symmetry of the precombustion chamber.

The invention still concerns an igniter for internal combustion engine containing a precombustion chamber defined by a precombustion chamber body having a head fitted with at least one passageway, the precombustion chamber being designed for including a combustible mixture, and an ignition system of the combustible mixture contained in the precombustion chamber, the head being coated at least partially externally with a coating layer of at least one refractory material.

Preferably, the precombustion chamber body is coated at least partially internally with a coating layer of at least one refractory material.

The passageway(s) of the head may also be coated with a coating layer of at least one refractory material.

Preferably, the refractory material(s) are selected among nitrides, borides, silicides, carbides, zirconium alloys, yttrium alloys, titanium alloys and boron alloys, oxides, preferably aluminium, titanium, iron, silicium, cerium, manganese and zirconium oxides, and zirconias having been subjected to the addition of at least one metal oxide selected among calcium, magnesium, yttrium, hafnium and rare earth oxides.

Preferred refractory materials are for instance $Al_2O_3$, $SiO_2$, $CeO_2$, $MnO_2$, $ZrO_2$, ZrY, Zr and Y being in stoichiometric proportions or not, and $TiB_2$, preferably $Al_2O_3$, ZrY, Zr and Y being in stoichiometric proportions or not, and $TiB_2$.

Preferably, the thickness of the coating layer ranges between 0.5 and 100 µm, preferably between 1 and 50 µm.

The invention will be understood better and other aims, advantages and features thereof will appear more clearly when reading the following description, in conjunction with the appended drawings.

Figure 1:
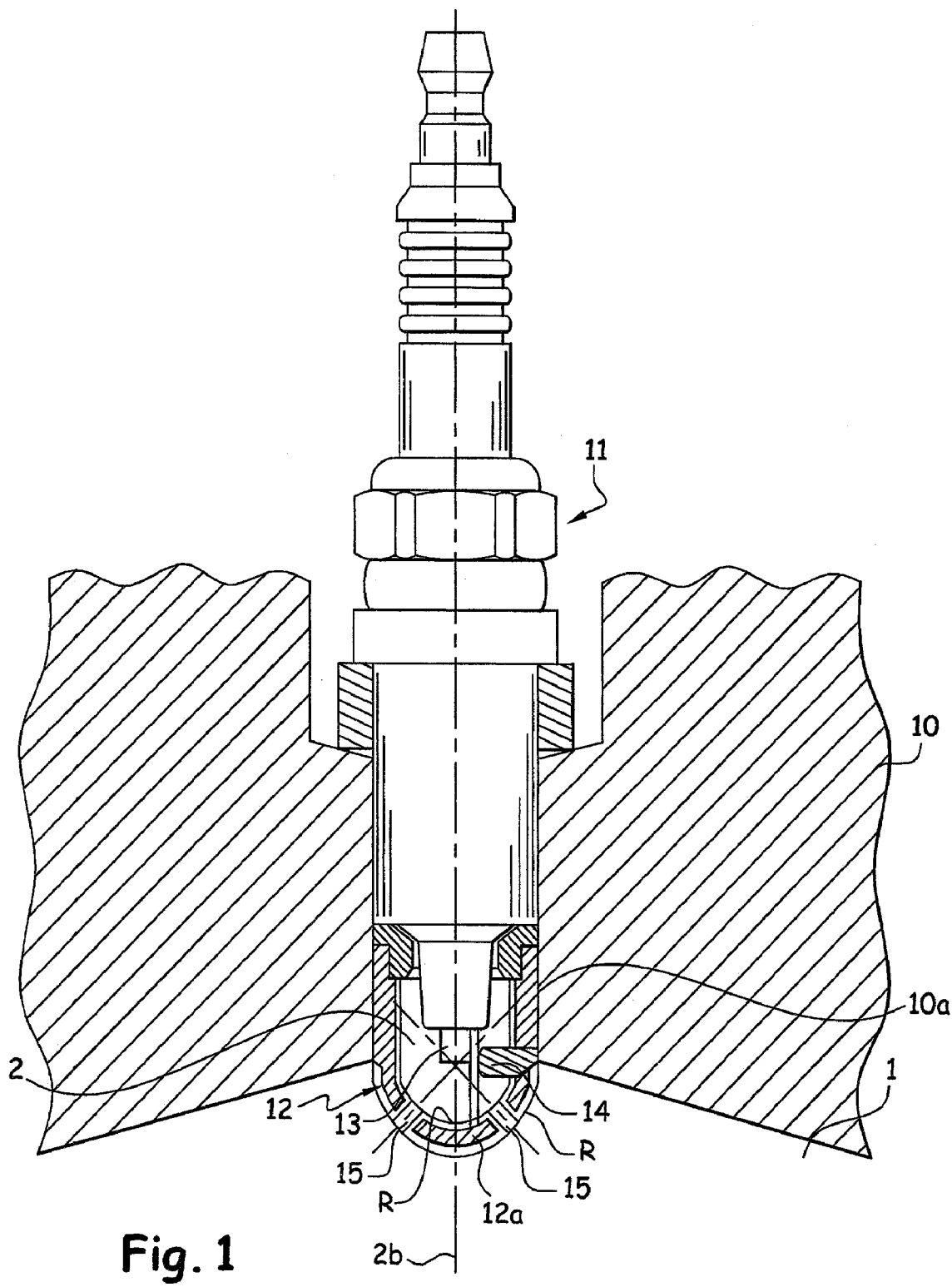
FIG. 1 represents a schematic, partially sectional view, of an ignition device including an igniter with precombustion chamber according to the invention.

A cylinder of an internal combustion engine, represented on FIG. 1, includes a main chamber 1 delineated by a jacket (not represented) and closed at the upper section thereof by a cylinder head 10. As usual, the main chamber 1 contains a piston (not represented) actuated in translation by a rod (not represented).

An igniter 11 with precombustion chamber according to the invention is attached in the cylinder head 10 in order to be adjoining the main chamber 1, for instance by screwing in a thread 10a of the cylinder head 10.

The igniter 11 includes a precombustion chamber body 12, generally tubular in shape, containing a head 12a, preferably having the form of a spherical cap, defining a precombustion chamber 2.

The head 12a of the precombustion chamber body 12 forms a separation wall between the main chamber 1 and the precombustion chamber 2. The head 12a communicates the precombustion chamber 2 with the main chamber 1 by dint of passageways 15.

Figure 2:
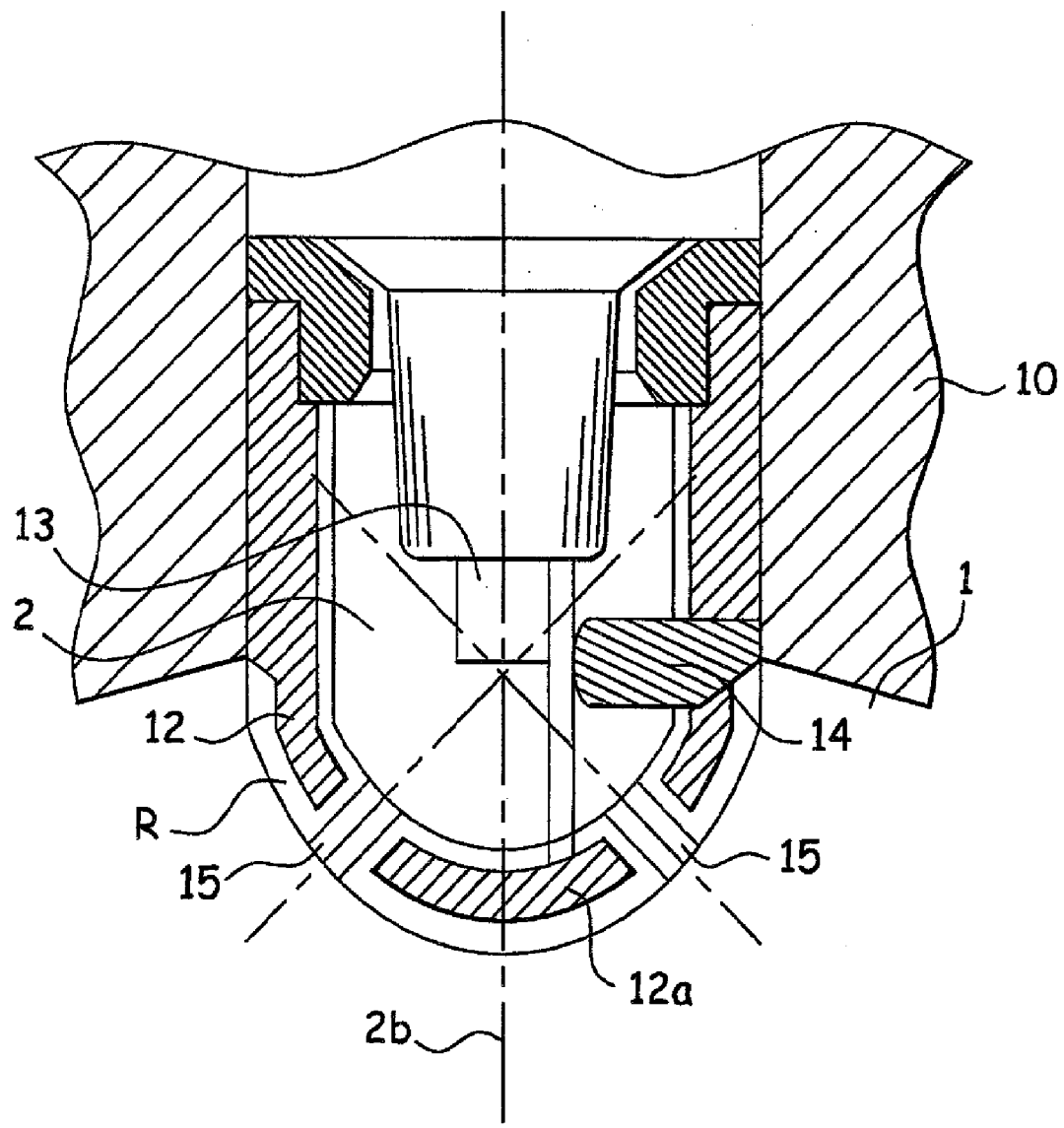
FIG. 2 represents an enlargement of FIG. 1.
Figure 3:
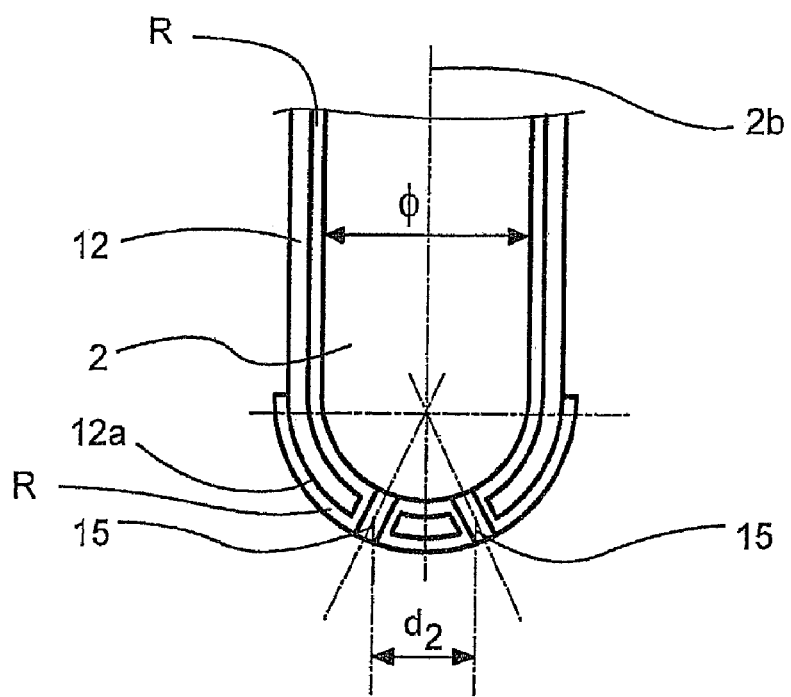
FIG. 3 represents a schematic, vertically sectional view of the precombustion chamber body of an igniter according to the invention.

According to the embodiment represented on FIGS. 1, 2 and 3, the internal wall of the precombustion chamber body 12, the external wall of the head 12a and the walls of the passageways 15 are coated with a coating layer (R) of at least one refractory material.

Generally, the precombustion chamber 2 has a volume ranging between 0.2 cm$^3$ and 2 cm$^3$, preferably ranging between 0.5 cm$^3$ and 1.5 cm$^3$.

Generally, the ratio S/V between the sum of the sections of the passageways 15 of the precombustion chamber and the volume of the precombustion chamber ranges between $10^{-3}$ mm$^{-1}$ and $5.10^{-2}$ mm$^{-1}$.

Optionally, the igniter may moreover include an intake (not represented) enabling to supply the precombustion chamber 2 with a mixture of air-fuel reactants formed upstream or to introduce fuel, the air being mixed with fuel in the precombustion chamber 2.

The precombustion chamber is fitted with an ignition system containing a central electrode 13 and a ground electrode 14.

When the ignition of the main mixture takes place by convection of the flame front from the precombustion chamber, the passageways 15 have preferably a diameter greater than 1 mm.

To prevent, at ignition, the propagation of a flame front while enabling the propagation of unstable compounds (ignition of the main mixture by self-ignition), the passageways 15 have then a small diameter, generally smaller than 1 mm, and, advantageously, a length smaller than the diameter thereof.

In the case of self-ignition of the main mixture, as shown on FIG. 2, the passageways 15 belong advantageously to a circle of diameter $d_2$ corresponding substantially to half the diameter $\phi$ of the precombustion chamber.

The centre of this circle may be on the axis symmetry 2b of the precombustion chamber 2, as shown on FIG. 3.

Figure 4:
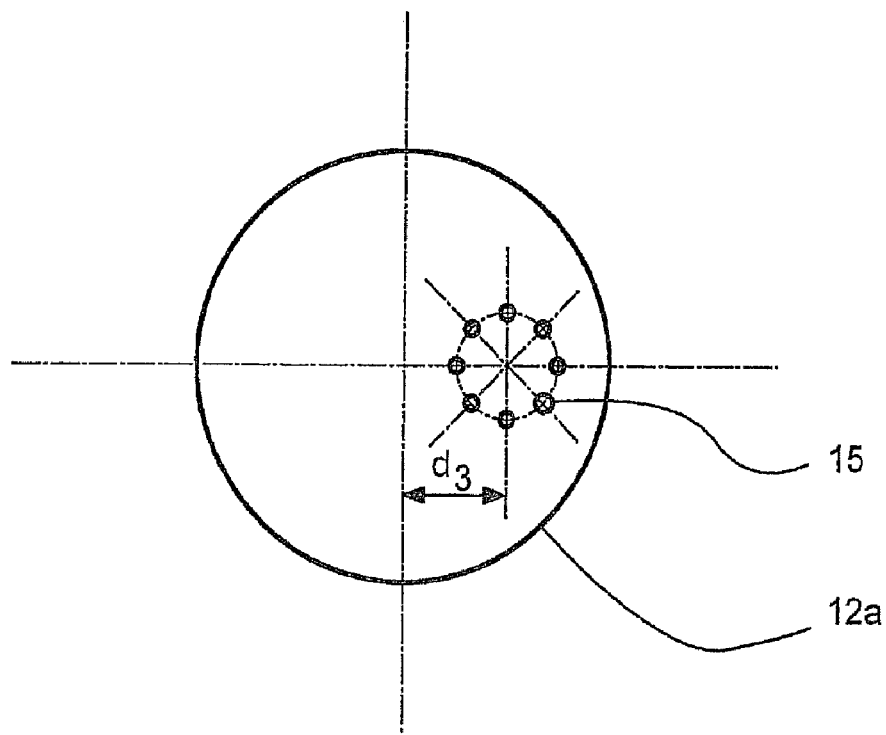
FIG. 4 is a view from beneath of the head of a precombustion chamber body of an igniter according to the invention.

The centre of this circle may also be situated at a distance $d_3$ from the axis of symmetry 2b of the precombustion chamber 2, as shown on FIG. 4, whereon passageways 15, 8 in number, have been represented.

One injects an air-fuel mixture in the main chamber and one supplies the precombustion chamber 2. One then produces a spark between the electrodes 13 and 14 while triggering thus the combustion in the precombustion chamber 2, so that the temperature and the pressure increase therein.

Under the effect of the higher pressure in the precombustion chamber 2 than in the main chamber 1, the flames, or the unstable compounds in the case when the dimension of passageways prevents the propagation of the flame front, are expelled in the form of jets towards the main chamber 1. Thus the main mixture contained in the main chamber 1 is ignited.

In both cases (ignition of the main mixture by convection of the flame is front or by self-ignition), the refractory coating layer on the internal wall of the precombustion chamber body 12, on the external wall of the head 12a and on the walls passageways 15 limits the heat transfers from the gases in combustion towards the precombustion chamber body 12, which increases considerably the efficiency of combustion accordingly in the precombustion chamber 2.

One improves thus the operation of the engine on small loads and at idle mode.

The invention claimed is:

1. An ignition device for internal combustion engine, containing:
   a main chamber designed for including a main combustible mixture, and fitted with a compression system of said mixture, and
   an igniter containing a precombustion chamber designed for receiving reactants and an ignition system of the reactants contained in the precombustion chamber, said precombustion chamber being defined by a precombustion chamber body having a head including at least one passageway, said head of the precombustion chamber body separating the precombustion chamber from the main chamber and communicating the precombustion chamber and the main chamber by dint of the passageway(s), wherein the head is coated at least partially externally with a coating layer of at least one refractory material.

2. Ignition device according to claim 1, wherein the precombustion chamber body is coated at least partially internally with a coating layer of at least one refractory material.

3. An ignition device according to claim 1, wherein the passageway(s) are coated with a coating layer of at least one refractory material.

4. An ignition device according to claim 1, wherein the coating layer is a nano-structured coating layer, the size of the grains being greater than or equal to 1 nm and smaller than 1000 nm.

5. An ignition device according to claim 1, wherein the coating layer consists either of a layer of at least one refractory material, or of two layers of at least one refractory material.

6. An ignition device according to claim 1, wherein the refractory material(s) are selected among nitrides, borides, silicides, carbides, zirconium alloys, yttrium alloys, titanium alloys and boron alloys, oxides.

7. An ignition device according to claim 1, wherein the refractory material(s) are selected among $Al_2O_3$, $SiO_2$, $CeO_2$, $MnO_2$, $ZrO_2$, ZrY, Zr and Y being in stoichiometric proportions or not, and $TiB_2$.

8. An ignition device according to claim 1, wherein the thickness of the coating layer ranges between 0.5 and 100 μm.

9. An ignition device according to claim 1, wherein the passageway(s) are of cylindrical shape and of diameter greater than 1 mm.

10. An ignition device according to claim 1, wherein the passageway(s) are capable of preventing the propagation of a flame front while enabling the propagation of unstable compounds derived from the combustion of the reactants contained in the precombustion chamber, the compression system of the main chamber and the seeding of the main mixture with said unstable compounds enabling mass self-ignition of the main mixture.

11. An ignition device according to claim 10, wherein said passageway(s) are in the form of a cylinder of diameter smaller than or equal to 1 mm.

12. An ignition device according to claim 10, wherein said passageway(s) have a length smaller than or equal to the diameter thereof.

13. An ignition device according to claim 10, wherein:
the upper section of the precombustion chamber body is in the form of a cylinder of inner diameter Φ, and
the head of the precombustion chamber body comprises several passageways, said passageways being circumscribed by a circular curve of diameter $d_2$ running through the centres of the outermost passageways, the ratio $d_2/\Phi$ being smaller than or equal to 0.5.

14. An ignition device according to claim 13, wherein the ratio $d_2/\Phi$ is smaller than or equal to ⅓.

15. An ignition device according to claim 13, wherein the centre of the curve running through the centres of the outermost passageways is situated on the axis symmetry of the precombustion chamber.

16. An ignition device according to claim 13, wherein the centre of the curve running through the centres of the outermost passageways is situated at a distance $d_3$ from the axis symmetry of the precombustion chamber, said distance $d_3$ being equal to or greater than the quarter diameter Φ of the precombustion chamber.

17. An igniter for internal combustion engine containing a precombustion chamber defined by a precombustion chamber body having a head fitted with at least one passageway, the precombustion chamber being designed for including a combustible mixture, and an ignition system of the combustible mixture contained in the precombustion chamber, wherein the head is coated at least partially externally with a coating layer of at least one refractory material.

18. An igniter according to claim 17, wherein the precombustion chamber body is coated at least partially internally with a coating layer of at least one refractory material.

19. An igniter according to claim 17, wherein the passageway(s) are coated with a coating layer of at least one refractory material.

20. An igniter according to claim 17, wherein the refractory material(s) are selected among nitrides, borides, silicides, carbides, zirconium alloys, yttrium alloys, titanium alloys and boron alloys, oxides.

21. An igniter according to claim 20, wherein the refractory material(s) are selected among $Al_2O_3$, $SiO_2$, $CeO_2$, $MnO_2$, $ZrO_2$, ZrY, Zr and Y being in stoichiometric proportions or not, and $TiB_2$.

22. An igniter according to claim 17, wherein the thickness of the coating layer ranges between 0.5 and 100 μm.

23. An ignition device according to claim 6, wherein the refractory material(s) are selected among aluminium, titanium, iron, silicium, cerium, manganese and zirconium oxides, and zirconias having been subjected to the addition of at least one metal oxide selected among calcium, magnesium, yttrium, hafnium and rare earth oxides.

24. An ignition device according to claim 7, wherein the refractory material(s) are selected among $Al_2O_3$, ZrY, Zr and Y being in stoichiometric proportions or not, and $TiB_2$.

25. An ignition device according to claim 8, wherein the thickness of the coating layer ranges between 1 and 50 μm.

26. An igniter according to claim 20, wherein the refractory material(s) are selected among aluminium, titanium, iron, silicium, cerium, manganese and zirconium oxides, and zirconias having been subjected to the addition of at least one metal oxide selected among calcium, magnesium, yttrium, hafnium and rare earth oxides.

27. An igniter according to claim 21, wherein the refractory material(s) are selected among $Al_2O_3$, ZrY, Zr and Y being in stoichiometric proportions or not, and $TiB_2$.

28. An igniter according to claim 22, wherein the thickness of the coating layer ranges between 1 and 50 μm.

* * * * *